(12) United States Patent
Kerner

(10) Patent No.: US 6,618,637 B1
(45) Date of Patent: Sep. 9, 2003

(54) METHOD AND CIRCUIT CONFIGURATION FOR MONITORING MACHINE PARAMETERS

(75) Inventor: Norbert Kerner, Traunwalchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/601,050

(22) PCT Filed: Jan. 13, 1999

(86) PCT No.: PCT/EP99/00138

§ 371 (c)(1),
(2), (4) Date: Oct. 20, 2000

(87) PCT Pub. No.: WO99/38055

PCT Pub. Date: Jul. 29, 1999

(30) Foreign Application Priority Data

Jan. 24, 1998 (DE) .......................................... 198 02 728

(51) Int. Cl.⁷ .............................................. G06F 19/00
(52) U.S. Cl. ........................ 700/108; 700/28; 700/173; 370/400
(58) Field of Search ................ 700/4, 95, 81, 700/163, 118, 159, 108, 109, 110, 28, 111, 174, 173; 370/400

(56) References Cited

U.S. PATENT DOCUMENTS

| | | | |
|---|---|---|---|
| 4,354,251 A | 10/1982 | Hellwig et al. ................ | 714/6 |
| RE31,247 E | * 5/1983 | Johnstone ...................... | 700/4 |
| 4,558,416 A | 12/1985 | Pauwels ........................ | 700/4 |
| 4,594,538 A | 6/1986 | Schmitt ....................... | 318/565 |
| 4,887,221 A | * 12/1989 | Davis et al. .................. | 451/11 |
| 4,918,690 A | 4/1990 | Markkula, Jr. et al. ..... | 370/400 |
| 4,939,728 A | 7/1990 | Markkula, Jr. et al. ..... | 370/419 |
| 4,969,147 A | 11/1990 | Markkula, Jr. et al. ..... | 370/400 |
| 5,689,170 A | * 11/1997 | Ishikawa .................... | 318/799 |
| 5,844,888 A | 12/1998 | Markkula, Jr. et al. ..... | 370/390 |
| 6,150,786 A | * 11/2000 | Kinoshita et al. ........... | 318/564 |

FOREIGN PATENT DOCUMENTS

| | | |
|---|---|---|
| DE | 29 13 999 | 10/1980 |
| DE | 30 24 370 | 1/1982 |
| DE | 43 32 144 | 3/1995 |
| DE | 195 32 144 | 3/1997 |
| EP | 0 590 175 | 4/1994 |
| EP | 0 742 499 | 11/1996 |
| EP | 0 742 505 | 11/1996 |
| EP | 0 744 676 | 11/1996 |
| WO | WO 89 04578 | 5/1989 |

OTHER PUBLICATIONS

A. Huck, "Verbesserung der Zuverlassigkeit und Verfugbarkeit von Prozessleitsystemen", Automatisierungstechnische Praxis, vol. 28, Feb., 1986, pp. 75–81.
Patent Abstracts of Japan, vol. 014, No. 163 (E–0910), Mar. 29, 1990 regarding Japanese reference 02 019042 published Jan. 23, 1990.
Copy of original claims for Ser. No. 09/077,849 filed Jun. 4, 1998—Brakelmann et al.
Copy of original claims for Ser. No. 09/332,813 filed Jun. 14, 1999—Baumartner et al.

* cited by examiner

Primary Examiner—Leo Picard
Assistant Examiner—Kidest Bahta
(74) Attorney, Agent, or Firm—Brinks Hofer Gilson & Lione

(57) ABSTRACT

A circuit configuration for monitoring machine parameters of a numerical controller for a machine tool where the circuit configuration includes a first processor calculating a first checksum and a third checksum, a first memory assigned to the first processor and has a bidirectional connection with the first processor, wherein the first memory stores machine parameters, a second processor calculating a second checksum and a fourth checksum, a second memory that has a bidirectional connection with the first processor and the second processor and a comparator connected to the first and second memories and the first and second processors, the comparator comparing the first and third checksums with one another and the second and fourth checksums with one another.

15 Claims, 3 Drawing Sheets

METHOD AND CIRCUIT CONFIGURATION FOR MONITORING MACHINE PARAMETERS

Applicant claims, under 35 U.S.C. §119, the benefit of priority of the filing date of Jan. 24, 1998 of a German patent application, copy attached, Serial Number 198 02 728.1, filed on the aforementioned date, the entire contents of which is incorporated herein by reference.

The present invention relates to a method for monitoring machine parameters in a numerical controller and to a circuit configuration for performing the method as generically defined by the preamble to claim 7.

DESCRIPTION OF THE RELATED ART

From European Patent Disclosure EP 742 499 A2, a method for secure processing of safety-oriented process signals is known. In it, process signals are carried independently of one another to at least two likewise-independent computers, which thus form at least two monitoring channels. In the computers, the process signals are subjected to a separate, projectable input signal processing. In this operation, a crosswise data and result comparison takes place. The signals formed by the input signal processing are interpreted in the monitoring channels, and output signals that take the applicable process state into account are generated; a crosswise data and result comparison is performed between each two monitoring channels. Next, the output signals generated are subjected in the two computers to a separate, projectable output signal processing; once again, the computers perform a crosswise data and result comparison. Finally, with the secure output signals of the monitoring channels that have been obtained, safety-relevant parameters of the process are controlled redundantly.

This version has the disadvantage that process signals have to be ascertained independently of one another. If parameters are input by the user, for instance in an initializing phase, independent ascertainment is not possible.

From European Patent Disclosure EP 742 505 A2, a device for safety-oriented monitoring of a machine is known in which for redundant, processor-supported monitoring, predeterminable data and data about current status parameters of the monitoring can all be written in, stored and read out separately. For monitoring the axis states, the read-out data and the data of the corresponding transducers are delivered to channel comparators in the two redundant channels, and if there is no match of the paired data, predeterminable error reactions are tripped by the channel comparators.

Here it is disadvantageous that redundant means for input, storage and readout have to be provided for each channel. Furthermore, the data to be monitored also have to be input separately by the user, redundantly for each channel.

From European Patent Disclosure EP 744 676 A2, a method and a device for safe operation of a numerical controller for machine tools or robots is known. In order to form identical output signals by means of two clock-controlled processors from identical input signals under correspondingly predeterminable conversion conditions, at the beginning of each cycle each processor reads out its preceding output signal and the output signal of the other processor from memory means and compares them with one another. If a predeterminable deviation is found to be exceeded, error reactions are tripped. If not, a new conversion operation is performed, and the new output signals of the processors are written into the memory means.

Here it is a disadvantage that this method can be suitably employed only for process parameters newly ascertained in the course of the process. Another disadvantage is that the results of the conversion operation are compared constantly, which requires a great deal of processor capacity.

From the professional field of electronic data processing, it is known to perform cyclic redundancy checks (CRCs). In them, a checksum for a group of data is calculated by a certain algorithm. If the CRC checksums for two groups of data match, then it can be assumed with very high probability that the two groups of data are absolutely identical. This is employed for instance for bulk memories, in that a CRC checksum is additionally calculated on the basis of the data to be stored, and is stored in memory. Upon readout of the data, the CRC checksum is recalculated and compared with the stored CRC checksum. If the stored and the calculated CRC checksums match, then no error has occurred as a result of the storage in memory. If the CRC checksums differ, then an error treatment is initiated.

SUMMARY OF THE INVENTION

An object and advantage of the present invention is therefore to disclose a method in which machine parameters in a numerical controller for a machine tool are monitored for changes; essentially, the machine parameters should remain unchanged over the entire service life of the machine or controller, yet monitoring them should not require completely redundant component groups. Thus, a circuit configuration for performing the method is also to be disclosed that has as few as possible additional component groups intended especially for monitoring the machine parameters.

The above object and advantage is attained by a method for monitoring machine parameters of a numerical controller by performing a first operation of a numerical controller for machine parameters that includes calculating a first checksum of the machine parameters in a first processor, converting at least two of the machine parameters in a second processor into internal parameters of the second processor, calculating a second checksum in the second processor, transmitting the second checksum to the first processor and storing the first and second checksums in a memory. The method further entails performing a second operation of the numerical controller by calculating a third checksum of the machine parameters in the first processor, calculating a fourth checksum of the internal parameters in the second processor, comparing the stored first checksum with the calculated third checksum, comparing the stored second checksum with the calculated fourth checksum, and wherein if at least one match is lacking during the comparing, then an error treatment is performed.

The above object and advantage is attained by a method for monitoring machine parameters of a numerical controller that includes performing a setup operation of a numerical controller for machine parameters that entails storing machine parameters in a memory assigned to a first processor, calculating a first checksum of the machine parameters in the first processor, converting at least two of the machine parameters in a second processor into internal parameters of the second processor and calculating a second checksum in the second processor based on at least the internal parameters of the second processor. The method further includes transmitting the second checksum to the first processor and storing the first and second checksums in the memory.

The above object and advantage is attained by a circuit configuration for monitoring machine parameters of a numerical controller for a machine tool where the circuit configuration includes a first processor calculating a first checksum and a third checksum, a first memory assigned to the first processor and has a bidirectional connection with the first processor, wherein the first memory stores machine parameters, a second processor calculating a second checksum and a fourth checksum, a second memory that has a bidirectional connection with the first processor and the second processor and a comparator connected to the first and second memories and the first and second processors, the comparator comparing the first and third checksums with one another and the second and fourth checksums with one another.

The method of the present invention has the advantage that the embodiment of a controller with two or more channels, which is required anyway, suffices to make secure machine parameters available to all the channels of the controller. There is no need for redundant input, storage, or cyclical comparison of each individual machine parameter. This is achieved in that in the redundant channels, independent CRC checksums are calculated on the basis of the machine parameters in order to ascertain any error, and only these CRC checksums of the different channels are compared redundantly with one another.

The circuit configuration of the present invention has the advantage that already-existing component groups are used jointly for monitoring the machine parameters. Special component groups used exclusively for monitoring are unnecessary.

The present invention will be described in further detail below in conjunction with the embodiments shown in the drawing. Shown are:

BRIEF DESCRIPTION OF THE DRAWINGS

FIG. 3 shows one possible embodiment of a circuit configuration for performing the method of the present invention.

DESCRIPTION OF THE PREFERRED EMBODIMENTS

It will be assumed below that the method of the present invention is used in a numerical controller of a machine tool. Numerical control is intended to make safe work possible work and is therefore embodied redundantly. In particular, the numerical controller has two processors MCU and CCU, which monitor one another mutually.

To enable adaptation between the numerical controller, drive units and the machine tool, machine parameters MP are provided. These machine parameters MP contain data that are needed by the controller to enable appropriate cooperation between the numerical controller, the drives, and the machine. For that purpose, the machine parameters MP contain for instance limit values for the terminal position monitoring of the axes, without which the numerical controller could not tell what the maximum possible travel motions are. Furthermore, the machine parameters MP can also contain values about the limit speeds if the guard door is open, data on axis group membership, and the stop reaction times. For storing machine parameters MP in memory that are sent once and for all in the setup operation and then are intended remain unchanged over a long period of time, a permanent memory SP-MCU is provided. Since these machine parameters MP are also needed for safe operation of the NC (numerical controlled) machine tool, it is necessary to perform redundant monitoring of these data for impermissible changes.

Figure 1:
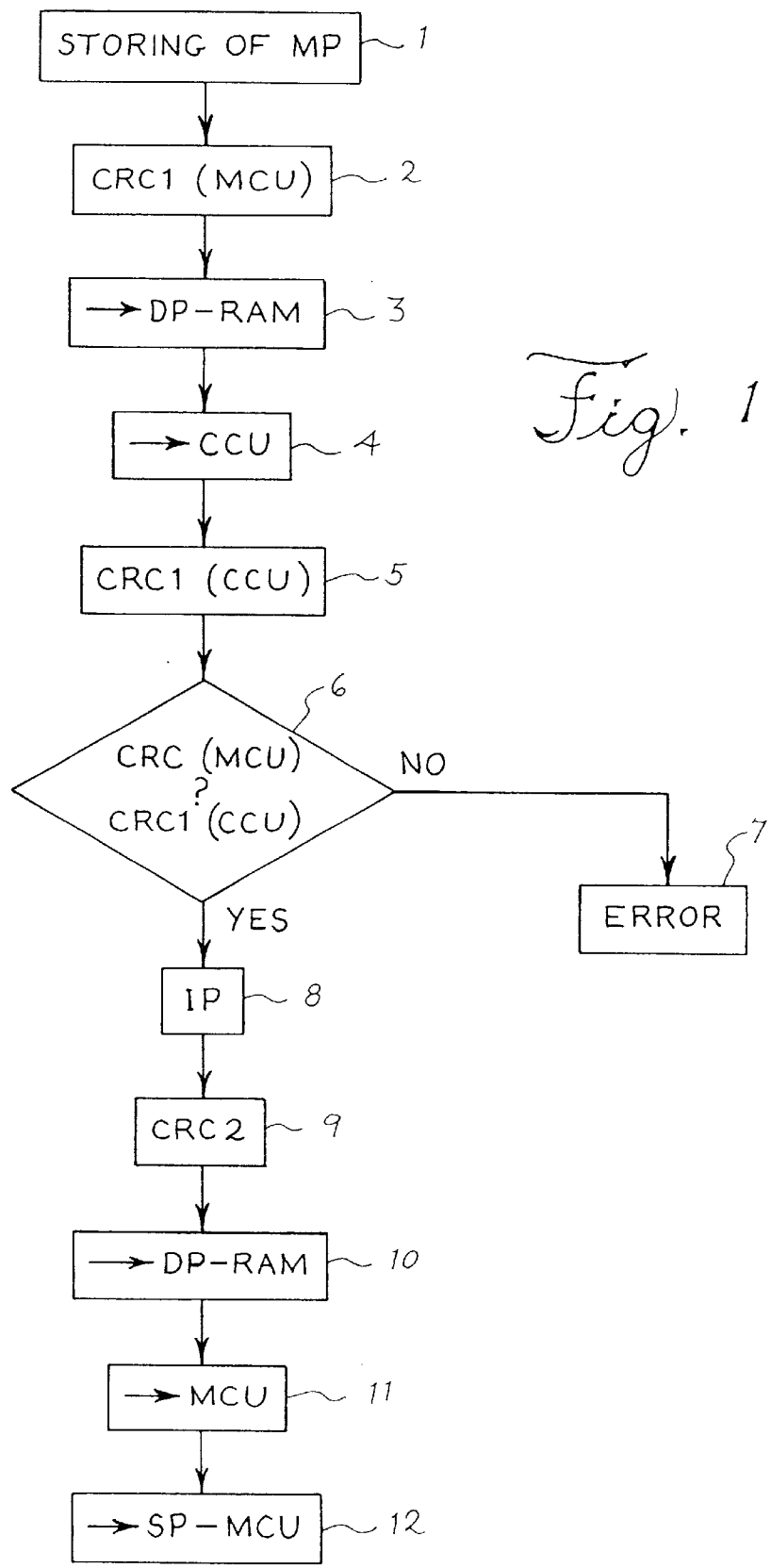
FIG. 1 one possible flowchart for the method of a invention in the setup mode.

In a setup operation, first the machine parameters MP dictated by the drive mechanisms or the machine or desired by the user are ascertained. In method step 1, shown in FIG. 1 these machine parameters MP are stored in a permanent memory SP-MCU, which is assigned to the first processor MCU. The permanent memory SP-MCU assures that if there is a power failure the machine parameters MP will not be lost and have to be re-ascertained.

After that, in method step 2, a first CRC checksum CRC1 is calculated by the first processor MCU for the stored machine parameters MP. This first CRC checksum CRC1 is both stored in the permanent memory SP-MCU and, together with the machine parameters MP from the first processor MCU, stored in method step 3 in a read-write memory DP-RAM. This read-write. memory DP-RAM is also accessible for reading and writing to a second processor CCU. The second processor CCU reads the machine parameters MP and the first CRC checksum CRC1 out of the read-write memory DP-RAM in method step 4. Next, in method step 5, the second processor CCU re-calculates this first CRC checksum CRC1 from the machine parameters MP and compares the read first CRC checksum CRC1 and the re-calculated first CRC checksum with one another in method step 6. If the two first CRC checksums CRC1 do not match, then in method step 7 an error signal is issued, and an error treatment is performed.

If they do match, then certain machine parameters MP required by the second processor CCU are converted in method step 8 into internal parameters IP. This is done on the basis of algorithms that are known to the second processor CCU. On the basis of these internal parameters IP of the second processor CCU, the unconverted machine parameters MP, and the first CRC checksum CRC1, a second CRC checksum CRC2 is calculated by the second processor CCU in method step 9. This second CRC checksum CRC2 is stored in the read-write memory DP-RAM by the second processor CCU in method step 10 and is read out by the first processor MCU from the read-write memory DP-RAM in method step 11. Next, the first processor MCU, in method step 12, stores the second CRC checksum CRC2 in a permanent memory SP-MCU accessible only to this first processor. After that, the setup operation is ended.

Thus in the setup operation, two CRC checksums CRC1 and CRC2 are calculated in the second processor CCU, and by the comparison of the first CRC checksum CRC1, transmitted by the first processor MCU, with the first CRC checksum CRC1 calculated in the second processor CCU, error-free transmission between the first processor MCU and the second processor CCU by means of the read-write memory DP-RAM is monitored.

If this transmission proves not to be error-free, then a new transmission is tripped by the second processor CCU. If a plurality of transmissions are detected as erroneous because of the first calculated and transmitted CRC checksums CRC1 in the second processor CCU differ from one another, then a corresponding error report is issued to the user.

If the transmission was error-free, then next, selected machine parameters MP are converted in the second processor CCU into internal parameters IP. These internal parameters IP are needed anyway by the second processor CCU for control and regulating purposes, so that their conversion represents no additional expense. For the internal parameters IP, the machine parameters MP not converted into internal parameters, and the first CRC checksum CRC1, a second CRC checksum CRC2 is calculated by the second processor. By observation of the second CRC checksum CRC2, it is therefore possible to monitor whether machine parameters MP, internal parameters IP, and the first CRC checksum CRC1 are error-free. The second CRC checksum CRC2 is transmitted to the first processor MCU by the read-write memory DP-RAM and stored there for later comparisons during regular operation.

Figure 2:
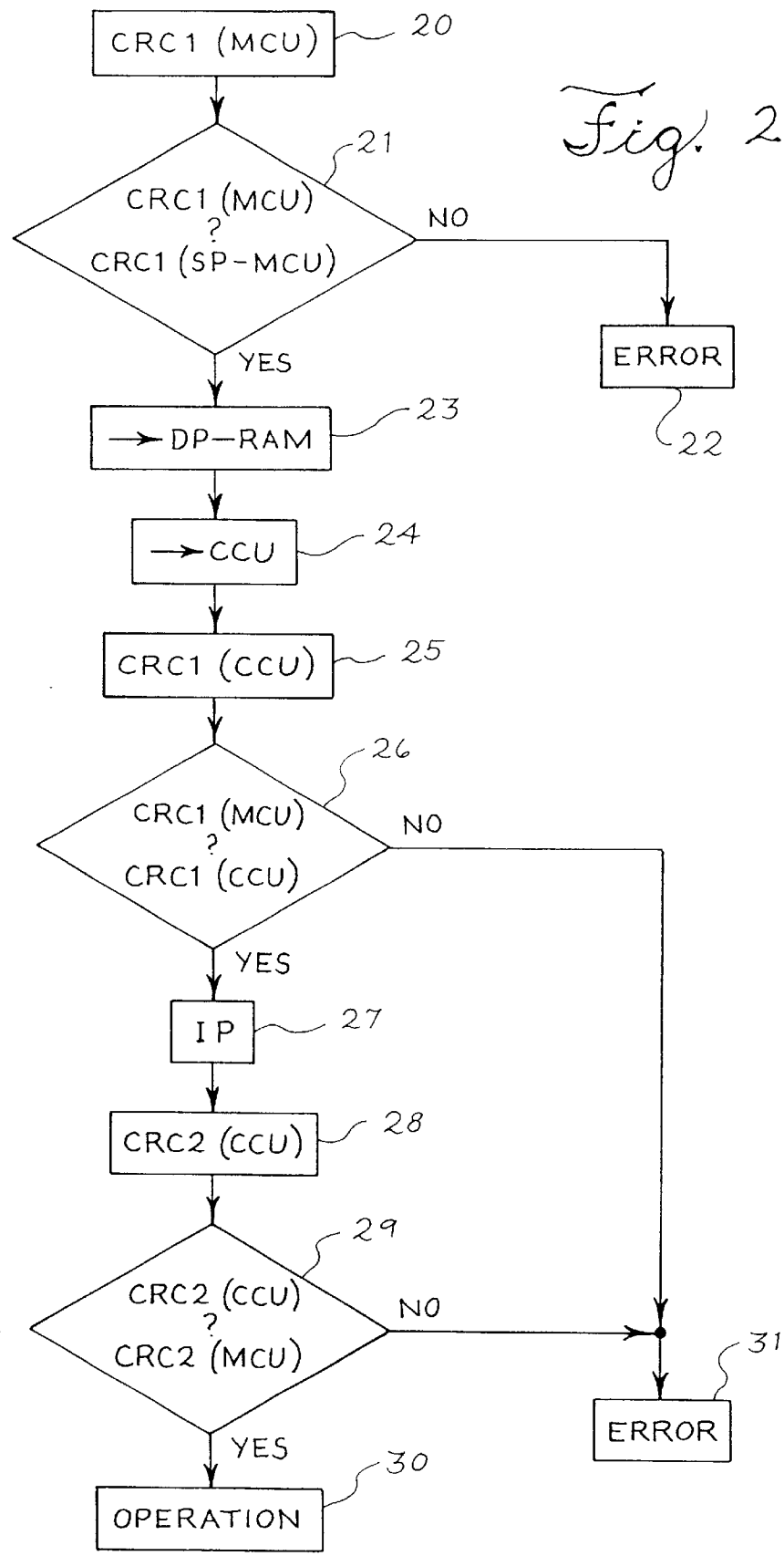
FIG. 2–FIG. 3 shows one possible flowchart for an embodiment the method of the present invention in regular operation.

The method sequence in regular operation is shown in FIG. 2. After the controller has been turned on, the first CRC checksum CRC1 is calculated by the first processor MCU in method step 20 on the basis of the machine parameters MP that are stored in the permanent memory SP-MCU assigned to the first processor MCU, and in method step 21 this first CRC checksum is compared by the first processor MCU with the first CRC checksum CRC1 stored in the memory SP-MCU. If these two first CRC checksums do not match, a defective memory SP-MCU can be detected and an error treatment can be initiated in method step 22.

If the two first CRC checksums match, the machine parameters MP, the first CRC checksum CRC1, and the second CRC checksum CRC2 are read out of the permanent memory SP-MCU by the first processor MCU in method step 23 and are stored in the read-write memory DP-RAM. From there, in method step 24, they are read out by the second processor CCU. In method step 25, on the basis of the machine parameters MP, the second processor CCU re-calculates the first CRC checksum CRC1 and compares it, in method step 26, with the transmitted first CRC checksum CRC1. As a result, it is monitored whether the transmission from the first processor MCU to the second processor CCU has taken place without error. If these two first CRC checksums CRC1 match, the second processor CCU, in method step 27, calculates the internal parameters IP, which are required anyway for operation, from certain machine parameters MP. From the internal parameters IP, machine parameters MP, and the first CRC checksum CRC1, then in method step 28 a second CRC checksum CRC2 is calculated by the second processor CCU and compared, in method step 29, with the second CRC checksum CRC2 transmitted by the first processor MCU. If these two second CRC checksums CRC2 also match, then it is assured that no unauthorized manipulation of the machine parameters MP and of the first CRC checksum CRC1 has occurred. In method step 30, the controller is then enabled for further operation.

However, if no match of one of the CRC checksums CRC1 or CRC2 has been detected, then as in method step 22, in method step 31 an error report is issued to the user, and the controller puts the machine tool in a safe state, which as a rule is done by not activating the drive mechanisms.

In regular operation, the CRC checksums CRC1 and CRC2 are monitored cyclically at certain time intervals. As a result, machine parameters MP that are defective in operation can also be detected, and provisions for assuring safe operation can be taken.

Figure 3:
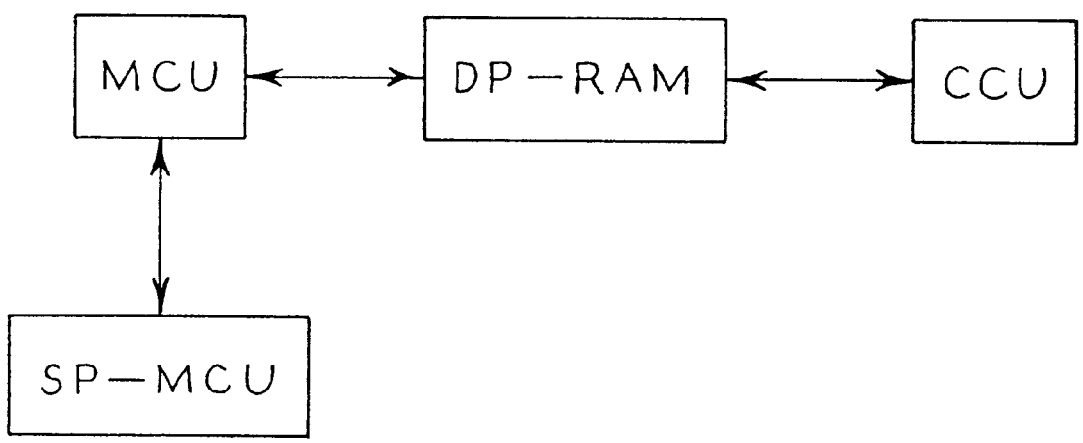

In FIG. 3, an embodiment of a circuit configuration of the present invention for performing the method of the invention is shown. A first processor MCU is connected via a bidirectional connection to a memory SP-MCU assigned to this first processor MCU. In addition, the first processor MCU is connected via a further bidirectional connection to a read-write memory DP-RAM. The read-write memory DP-RAM is connected to a second processor CCU via a further bidirectional connection.

The memory SP-MCU assigned to the first processor is advantageously designed as a permanent memory, so that if its supply voltage is turned off, the data stored in the memory SP-MCU are preserved. This memory SP-MCU is therefore advantageously embodied by a ROM, EPROM or EEPROM.

The two processors MCU and CCU are advantageously realized in the form of MISC, RISC or digital signal processors, depending on what additional tasks for controlling the machine tool the processors perform.

Although according to the invention the machine parameters MP are monitored redundantly in both processors, no additional, independent permanent memory for the second processor CCU is required. Because of the method of the invention, one permanent memory SP-MCU is sufficient to furnish secure machine parameters MP for the numerical controller.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for monitoring machine parameters of a numerical controller, said method comprising:
    performing a first operation of a numerical controller for machine parameters, comprising:
        calculating a first checksum of said machine parameters in a first processor;
        converting at least two of said machine parameters in a second processor into internal parameters of said second processor;
        calculating a second checksum based on said internal parameters in said second processor;
        transmitting said second checksum to said first processor;
        storing said first and second checksums in a memory;
    performing a second operation of said numerical controller, comprising:
        calculating a third checksum of said machine parameters in said first processor;
        calculating a fourth checksum of said internal parameters in said second processor;
        comparing said stored first checksum with said calculated third checksum;
        comparing said stored second checksum with said calculated fourth checksum; and
        wherein if at least one match is lacking during said comparing, then an error treatment is performed.

2. The method of claim 1, wherein said performing said first operation further comprises:
    storing said machine parameters in said memory;
    calculating said first checksum in said first processor based on said machine parameters stored in said memory;
    transmitting said machine parameters and said first checksum to said second processor;
    recalculating said first checksum by said second processor based on said transmitted machine parameters; and
    wherein if there is no match between said transmitted first checksum and said recalculated first checksum, an error treatment is initiated.

3. The method of claim 2, wherein if there is a match between said transmitted first checksum and said recalculated first checksum, then perform the following:
   calculating internal parameters from said machine parameters in said second processor;
   calculating said second checksum by said second processor based on said internal parameters and said first checksum;
   transmitting said second checksum from said second processor to said first processor; and
   storing said transmitted second checksum in said memory.

4. The method of claim 1, wherein said performing said second operation further comprises:
   calculating said third checksum in said first processor based on said machine parameters; and
   comparing said calculated third checksum with said first checksum stored in said memory, wherein if there is no match an error treatment is initiated.

5. The method of claim 4, wherein if there is a match between said calculated third checksum and said stored first checksum, then perform the following:
   reading said second checksum out of said memory;
   transmitting said machine parameters, said first checksum and said second checksum to said second processor;
   calculating said third checksum by said second processor based on said machine parameters; and
   comparing said calculated third checksum by said second processor with said transmitted first checksum, wherein if there is no match an error treatment is initiated.

6. The method of claim 5, wherein if there is a match between said calculated third checksum by said second processor and said transmitted first checksum, then perform the following:
   calculating internal parameters based on said machine parameters in said second processor;
   calculating said fourth checksum based on said internal parameters and said first checksum; and
   comparing said calculated fourth checksum with said transmitted second checksum; and that if there is no match an error treatment is initiated.

7. The method of claim 1, wherein for transmitting data from said first processor to said second processor and vice versa, said data to be transmitted are written by said first processor into a read-write memory and are read out of said read-write memory by said second processor, and vice versa.

8. The method claim 1, further comprising:
   initiating said first operation upon connection of said numerical controller to a supply voltage; and
   performing said second operation at regular intervals during operation of said numerical controller.

9. The method of claim 1, wherein said error treatment is blocking operation of said numerical controller.

10. The method of claim 1, wherein said machine parameter corresponds to a machine tool.

11. A method for monitoring machine parameters of a numerical controller, said method comprising:
   performing a setup operation of a numerical controller for machine parameters, comprising:
      storing machine parameters in a memory assigned to a first processor;
      calculating a first checksum of said machine parameters in said first processor;
      converting at least two of said machine parameters in a second processor into internal parameters of said second processor;
      calculating a second checksum in said second processor based on at least said internal parameters of said second processor;
      transmitting said second checksum to said first processor; and
      storing said first and second checksums in said memory.

12. The method of claim 11, further comprising:
   performing a regular operation of said numerical controller, comprising:
      calculating a third checksum of said machine parameters in said first processor;
      calculating a fourth checksum of said internal parameters in said second processor;
      comparing said stored first checksum with said calculated third checksum;
      comparing said stored second checksum with said calculated fourth checksum; and
      wherein if at least one match is lacking during said comparing, then an error treatment is performed.

13. A circuit configuration for monitoring machine parameters of a numerical controller for a machine tool, said circuit configuration comprising:
   a first processor calculating a first checksum and a third checksum;
   a first memory assigned to said first processor and has a bidirectional connection with said first processor, wherein said first memory stores machine parameters;
   a second processor calculating a second checksum and a fourth checksum;
   a second memory that has a bidirectional connection with said first processor and said second processor; and
   a comparator connected to said first and second memories and said first and second processors, said comparator comparing said first and third checksums with one another and said second and fourth checksums with one another.

14. The circuit configuration of claim 13, wherein said second processor calculates a fifth checksum and said comparator compares said first and fifth checksums with one another.

15. The circuit configuration of claim 14, wherein said memory assigned to said first processor is embodied as a permanent memory.

* * * * *

UNITED STATES PATENT AND TRADEMARK OFFICE
CERTIFICATE OF CORRECTION

PATENT NO. : 6,618,637 B1
DATED : September 9, 2003
INVENTOR(S) : Norbert Kerner It is certified that error appears in the above-identified patent and that said Letters Patent is hereby corrected as shown below:

Column 7,
Line 1, after "method" insert -- of --.

Signed and Sealed this

Twenty-seventh Day of July, 2004

JON W. DUDAS
*Acting Director of the United States Patent and Trademark Office*